United States Patent

Bermes et al.

Patent Number: 5,431,723
Date of Patent: Jul. 11, 1995

[54] USE OF LIQUID PREPARATIONS OF A DISAZO DYE IN THE INK JET PROCESS AND THE DIAZO DYE

[75] Inventors: Rudolf Bermes, Ludwigshafen; Rainer Dyllick-Brenzinger, Weinheim; Karin H. Beck, Ludwigshafen, all of Germany

[73] Assignee: BASF Aktiengesellschaft, Ludwigshafen, Germany

[21] Appl. No.: 99,319

[22] Filed: Jul. 30, 1993

[30] Foreign Application Priority Data

Aug. 20, 1992 [DE] Germany ............ 42 27 591.1

[51] Int. Cl.⁶ .................................... C09D 11/02
[52] U.S. Cl. .................... 106/22 K; 106/20 D; 534/689
[58] Field of Search .......... 106/22 K, 20 D; 534/689

[56] References Cited

U.S. PATENT DOCUMENTS

| | | | |
|---|---|---|---|
| 2,489,463 | 11/1949 | Reynolds | 106/22 K |
| 4,118,182 | 10/1978 | Smith | 8/641 |
| 5,007,942 | 4/1991 | Claussen et al. | 8/506 |
| 5,062,892 | 11/1991 | Halko | 106/22 R |
| 5,062,893 | 11/1991 | Adamic et al. | 106/22 K |
| 5,203,876 | 4/1993 | Käser | 8/641 |

FOREIGN PATENT DOCUMENTS

| | | |
|---|---|---|
| 0013750 | 8/1980 | European Pat. Off. |
| 0035152 | 9/1981 | European Pat. Off. |
| 0270003 | 6/1988 | European Pat. Off. |
| 0352229 | 1/1990 | European Pat. Off. |
| 3445225 | 6/1986 | Germany |
| 3710077 | 10/1988 | Germany |

OTHER PUBLICATIONS

Chemical Abstracts, AN-247313, JP-A-4 168166, Jun. 16, 1992.

*Primary Examiner*—Helene Klemanski
*Attorney, Agent, or Firm*—Oblon, Spivak, McClelland, Maier, & Neustadt

[57] ABSTRACT

Useful for the ink jet process are dye preparations which contain from 0.01 to 10% by weight, based on the weight of the preparation, of a dye quantity which is from 90 to 100% by weight the dye of the formula I

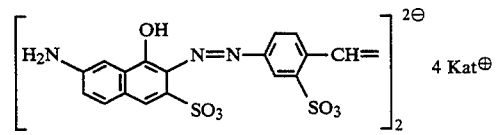

where Kat⊕ is the equivalent of a metal or ammonium ion, from 0 to 15% by weight, based on the weight of the preparation, of one or more water-miscible organic solvents, and from 75 to 99.99% by weight, based on the weight of preparation, of water and which are essentially free of foreign salts, in the ink jet process.

10 Claims, No Drawings

USE OF LIQUID PREPARATIONS OF A DISAZO DYE IN THE INK JET PROCESS AND THE DIAZO DYE

The present invention relates to the use of dye preparations which contain from 0.01 to 10% by weight, based on the weight of the preparation, of a dye quantity which is from 90 to 100% by weight the dye of the formula

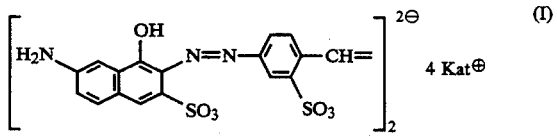

where Kat⊕ is the equivalent of a metal or ammonium ion, from 0 to 15% by weight, based on the weight of the preparation, of one or more water-miscible organic solvents, and from 75 to 99.99% by weight, based on the weight of the preparation, of water and which are essentially free of foreign salts, in the ink jet process, and to the pure disazo dye of the formula I in the form of free acid.

The ink jet process is known. It comprises directing droplets of a recording fluid (ink) from one or more small jets onto material such as paper, wood, textiles, plastic or metal in a specific manner. Individual droplets are grouped together by electronic control to form script characters or graphics.

U.S. Pat. No. 4,118,182 discloses aqueous dye solutions which in addition to the dye of the formula I, whose diazo component is 4,4'-diaminostilbene-2,2'-disulfonic acid (flavonic acid) and whose coupling component is 1-hydroxy-7-aminonaphthalene-3-sulfonic acid (γ-acid), additionally contain a dye with the same diazo component but 1-hydroxy-8-aminonaphthalene-3,6-disulfonic acid (H-acid) as coupling component. Since there the synthesis is effected by mixed coupling, a third dye is present with both γ-acid and H-acid as coupling component.

EP-A-13 750 and EP-A-270 003, furthermore, describe as-synthesized solutions which contain the dye of the formula I.

The aqueous as-synthesized reaction solution described in EP-A-13 750 has a high foreign salt content and is reacted with a further diazonium salt to form a polyazo dye.

The as-synthesized solution described in EP-A-270 003 must, it is taught there, subsequently be additionally admixed with a yellow dye in order that a useful liquid black mixture may be obtained.

It is an object of the present invention to provide liquid dye preparations which are advantageously used in the ink jet process and accordingly have favorable application properties for that purpose, in particular good light fastness, water fastness and abrasion fastness.

We have found that this object is achieved by the dye preparations defined at the beginning.

Printing of a substrate with an ink using the ink jet process is achieved advantageously when the ink comprises at least one dye preparation as defined at the beginning.

As mentioned earlier, the dye consists essentially, i.e. to an extent of 90 to 100% by weight, preferably 95 to 100% by weight, based on the dye quantity, of the dye of the formula I.

Additionally there may be present from 0 to 10% by weight, preferably 0 to 5% by weight, based on the dye quantity, of one or more shading dyes, e.g. C.I. Acid Yellow 23 (19 140), C.I. Acid Blue 9 (42 090), C.I. Direct Red 254, C.I. Direct Blue 86 (74 180), C.I. Reactive Red 24, C.I. Reactive Blue 49, C.I. Reactive Red 72 or the dyeacid of the reaction product of tetrazotized flavonic acid with 1-amino-8-hydroxynaphthalene-3,6-disulfonic acid or 2-hydroxy-3-methylbenzoic acid, in each case in a molar ratio of 1:2.

Kat⊕ in the formula I is the equivalent of a cation, and is derived from metal or ammonium ions. Metal ions are in particular the lithium, sodium, potassium, magnesium or calcium ions. Ammonium ions are either substituted or unsubstituted ammonium cations. Examples of substituted ammonium cations are monoalkyl-, dialkyl-, trialkyl-, tetraalkyl- or benzyltrialkylammonium cations or cations derived from nitrogen-containing five- or six-membered saturated heterocycles, such as pyrrolidinium, piperidinium, morpholinium, piperazinium or N-alkylpiperazinium cations or their N-monoalkyl- or N,N-di-alkyl-substituted products. Alkyl is here to be understood as meaning in general straight-chain or branched $C_1$–$C_{20}$-alkyl which may be substituted by hydroxyl and/or interrupted by 1 or 2 oxygen atoms in ether function.

Of particular suitability are lithium, sodium or potassium ions, of which lithium or sodium ions must be given particular emphasis.

The water-miscible organic solvents employed are for example $C_1$–$C_4$-alkanols, such as methanol, ethanol, propanol, isopropanol, butanol, isobutanol, sec-butanol or tert-butanol, carboxamides, N,N-dimethylformamide or N,N-dimethylacetamide, lactams, such as ε-caprolactam or N-methylpyrrolidin-2-one, urea, cyclic ureas, such as 1,3-dimethylimidazolidin-2-one or 1,3-dimethyl-hexahydropyrimid-2-one, ketones or keto alcohols, such as acetone, methyl ethyl ketone or 2-methyl-2-hydroxypentan-4-one, ethers, such as tetrahydrofuran or dioxane, mono-, oligo- or polyalkylene glycols or thioglycols with $C_2$–$C_6$-alkylene units, such as ethylene glycol, 1,2- or 1,3-propylene glycol, 1,2- or 1,4-butylene glycol, 1,6-hexylene glycol, diethylene glycol, triethylene glycol, dipropylene glycol, thiodiglycol, polyethylene glycol or polypropylene glycol, other polyols, such as glycerol or 1,2,6-hexanetriol, $C_1$–$C_4$-alkyl ethers of polyhydric alcohols, such as ethylene glycol monomethyl or monoethyl ether, diethylene glycol monomethyl or monoethyl ether or triethylene glycol monomethyl or monoethyl ether, γ-butyrolactone or dimethyl sulfoxide.

Examples of preferred water-miscible organic solvents are N-methylpyrrolidin-2-one, mono-, di- or trialkylene glycols with $C_2$–$C_6$-alkylene units, in particular mono-, di- or triethylene glycol or dipropylene glycol, and dimethyl sulfoxide. Very particular emphasis must be given to N-methylpyrrolidin-2-one, diethylene glycol and dimethyl sulfoxide.

The dye preparations for use according to the invention contain from 0.01 to 10% by weight, preferably from 0.1 to 5% by weight, in particular from 2 to 4% by weight, each percentage being based on the weight of the preparation, of dye.

The dye preparations further contain from 0 to 15% by weight, preferably from 5 to 15% by weight, in particular from 5 to 10% by weight, each percentage being based on the weight of the preparation, of one or more water-miscible organic solvents.

The dye preparations further contain from 75 to 99.99% by weight, preferably from 80 to 94.9% by weight, in particular from 86 to 93% by weight, each percentage being based on the weight of the preparation, of water.

Further constituents of the dye preparations usable according to the invention can be for example auxiliaries, such anionic, cationic or nonionic surfactants, conducting salts, fungicides, corrosion inhibitors or perfume oils. The proportion of these components is in general from 0 to 10% by weight, preferably from 0 to 5% by weight, each percentage being based on the weight of the preparation.

The dye preparations for use according to the invention should be essentially free of foreign salts. This means for the purposes of the present invention that they may additionally contain minor amounts, for example from 0 to 10% by weight, preferably from 0 to 5% by weight, in particular about 0% by weight, each percentage being based on the weight of the preparation, of foreign salts.

Foreign salts for the purposes of the present invention are in general those salts which can be produced in the course of the synthesis (azo coupling) of the dyes of the formula I, e.g. sodium chloride, potassium chloride, sodium sulfate or potassium sulfate.

The dye preparations for use according to the invention may be obtained for example by neutralizing the dye of the formula Ia

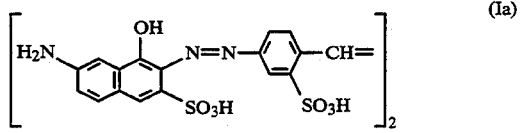
(Ia)

with parent bases of the cation Kat⊕, for example with the corresponding alkali metal or alkaline earth metal hydoxides, alkaline earth metal oxides, ammonia or the corresponding amines, and mixing with one or more water-miscible organic solvents, water and optionally auxiliaries in the above-stated ratios.

A further possibility is for example first to prepare the dye of the formula I, for example as described in EP-A-13 570 (with K⊕=Na), and crystallizing it from the reaction solution. This dye can then be used for preparing the preparation as described for the free acid.

It is also possible to use an as-synthesized solution that is virtually free of foreign salts, as obtained for example in EP-A-270 003 by diazotization with nitrous esters, for the use according to the invention, if desired after addition of further of the abovementioned substances.

The pure form of the dye of the formula Ia comprises a further part of the subject-matter of the present invention. It can be obtained advantageously for example by diazotizing 4,4'-diaminostilbene-2,2'-disulfonic acid of the formula II

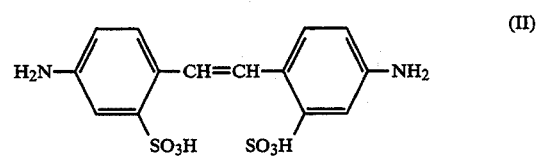
(II)

in a conventional manner and coupling with 1-hydroxy-7-aminonaphthalene-3-sulfonic acid (y-acid) of the formula III

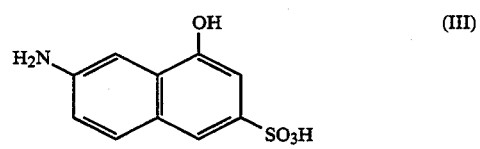
(III)

in an alkaline medium. After the coupling reaction has ended, the reaction mixture can be acidified with hydrochloric acid to bring down the dye of the formula Ia as a precipitate. It can be separated off, washed and dried.

The pure form of the dye of the formula Ia can be used for preparing the dye preparations usable according to the invention, as described earlier. It is also advantageous for dyeing paper and leather.

Furthermore, the dye preparations of the invention are useful as marking fluids in writing implements or as the base for coating compositions, e.g. wood stains, printing inks, color ribbon inks, stamp inks or ballpoint pen pastes. They are also suitable for dyeing paper in the pulp.

The preparations of the invention have advantageous application properties, for example favorable water, light and abrasion fastness properties.

Embodiments of the invention will now be more particularly described by way of example.

Preparation of the dyeacid

EXAMPLE 1

16 g of 50% strength by weight sodium hydroxide solution, 37 g of 4,4'-diaminostilbene-2,2'-disulfonic acid and 14 g of sodium nitrite were dissolved in succession in 350 ml of water at room temperature. This solution was added with thorough stirring to a mixture of 100 ml of water, 200 g of ice and 108 g of 5N hydrochloric acid. The small excess of nitrous acid was destroyed after stirring at 5°–10° C. for 1 hour by the addition of a little amidosulfuric acid.

In a second reaction vessel a solution of 47.9 g of 1-hydroxy-7-aminonaphthalene-3-sulfonic acid and 92.5 g of sodium bicarbonate in 350 ml of water was prepared, to which the suspension of the above diazonium salt was added at a sufficiently slow rate for the pH of the batch not to drop below 7.5. After the coupling reaction had ended, the batch was acidified with 238 g of 5N sulfuric acid to pH 0.5 and filtered with suction, and the filter residue was washed with 500 ml of 0.5% strength by weight hydrochloric acid and dried to leave 92 g of the dye of the formula

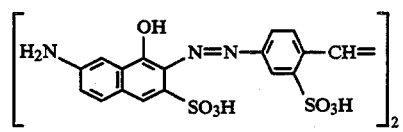

General method for preparing a dye preparation from the dyeacid of Example 1 and test method:

From 2 to 5 parts by weight of the pulverulent dyeacid are dissolved in from 95 to 98 parts by weight of a liquid with the addition of lithium hydroxide (up to a pH of from 5 to 10).

The solution is pressure filtered through a Teflon filter of pore size 1μm and then devolatilized under reduced pressure.

This recording fluid is used to fill the reservoir of an ink jet printing head, which under the influence of supplied heat expels the ink in droplets.

The prints obtained are used to test water fastness, light fastness and marker fastness.

The tests were evaluated by colorimetric measurements using the CIELAB system, where $L^*$ is a measure of the lightness of a color and extends from 0 (for black) to 100 (for white). The $\Delta L^*$ values are used as measures of the fastness properties. A small $\Delta L^*$ value means that the print hardly changes under the test conditions.

In the examples which follow the dyeacid concentration was in each case 3% by weight. The liquid used in Examples 2 to 4 was 1:9 v/v N-methylpyrrolidin-2-one (NMP) water and in Example 5 1:9 v/v formamide/water.

| Ex. No. | pH | $L^*$ | $\Delta L^*$ (after test of water fastness) | $\Delta L^*$ (after test of light fastness) 4h | 8h |
| --- | --- | --- | --- | --- | --- |
| 2 | 6 | 28.6 | 2.1 | | |
| 3 | 7 | 27.4 | 2.3 | | |
| 4 | 8 | 27.3 | 2.5 | | |
| 5 | 8 | 31.8 | 2.0 | −0.1 | 0.8 |

Dye preparations with similar properties are obtained on using—instead of lithium hydroxide—sodium hydroxide, potassium hydroxide, calcium oxide, magnesium oxide, tridecylamine, 3-(2-ethylhexyl)propylamine, ethanolamine or diethanolamine for setting the pH.

The following examples illustrate the influence of the dye concentration:

The liquid used in all cases was 1:9 v/v NMP/water. The pH was adjusted to 8 with lithium hydroxide.

| Ex. | Dyeacid concentration [% by weight] | $L^*$ | $\Delta L^*$ (after test of water fastness) | $\Delta L^*$ (after test of light fastness) 4h | 8h |
| --- | --- | --- | --- | --- | --- |
| 6 | 2 | 30.8 | 2.8 | 1.3 | 1.9 |
| 7 | 3 | 27.3 | 3.3 | 0.8 | 1.6 |
| 8 | 4 | 27.0 | 2.2 | −0.1 | 0.7 |

The following experiments illustrate the effect of surfactants:

3 parts by weight of the dyeacid of Example 1 are admixed with 97 parts by weight of 1:9 v/vNMP and water. The resulting mixture is adjusted with lithium hydroxide to pH 8.3 by stirring, and all of the dyeacid dissolves. To this solution is added an auxiliary as further explained in the examples. In this way it is possible to improve the water fastness, the marker fastness, the abrasion fastness and the light fastness, to shorten the drying time of the ink on the paper after writing, and to optimize the migration of the dye into the paper.

| Ex. No. | Auxiliaries (% by weight, based on weight of preparation) | $L^*$ | $\Delta L^*$ (after test of water fastness) |
| --- | --- | --- | --- |
| 9 | A (1) | 27.9 | 7.8 |
| 10 | B (1) | 26.6 | 10.4 |
| 11 | C (1) | 26.3 | 10.6 |
| 12 | D (1) | 26.4 | 8.4 |
| 13 | E (1) | 26.6 | 7.6 |
| 14 | F (1) | 40.0 | 3.4 |
| 15 | F (0.5) | 35.8 | 7.9 |
| 16 | F (0.3) | 30.3 | 17.5 |
| 17 | F (0.1) | 27.1 | 8.0 |

The following auxiliaries were used:
Auxiliary A: acid phosphoric esters of a fatty alcohol alkoxylate
Auxiliary B: mixture of an α-alkylalkanoic acid and a fatty alcohol alkoxylate
Auxiliary C: ethoxylated tallow fat alcohol
Auxiliary D: castor oil ethoxylate
Auxiliary E: reaction product of ethylene oxide with hydrogenated castor oil
Auxiliary F: sodium salt of a fatty acid condensation product

EXAMPLE 18

37.3 g of 4,4'-diaminostilbene-2,2'-disulfonic acid in the form of the disodium salt were dissolved in 550 ml of water, admixed with 13.8 g of sodium nitrite in the form of a 30% strength by weight aqueous solution, and poured over 30 minutes into 61 g of 30% strength by weight hydrochloric acid and 50 g of ice. The temperature rose to 8° C. The mixture was subsequently stirred for hours, during which the temperature gradually rose to 17° C. Then 47.8 g of 1-hydroxy-7-aminonaphthalene-3-sulfonic acid were dissolved in 500 ml of water with the addition of 80 g of sodiumhydroxide and admixed with the suspension of the bisdiazo compound, while the pH was continuously maintained at 10 by the addition of 40 g of sodium carbonate in the form of a 20% strength by weight aqueous solution and the temperature at 10° C. by the addition of ice. After 1 hour of stirring, the precipitated disazo dye was filtered off with suction, washed with a little water and dried.

This dye can likewise be used for preparing a dye preparation which gives similar results to those described above.

EXAMPLE 19

74.1 g of 4,4,'-diaminostilbene-2,2'-disulfonic acid and 300 ml of water were stirred together at room temperature and admixed dropwise with 36 g of 1,3-bis-(nitrosyloxy)-2,2-dimethylpropane in the course of about two hours. After stirring for 3 hours the remaining nitrite excess was destroyed with small additions of amidosulfuric acid. The suspension obtained was then added at 20°–30° C. with thorough stirring to a solution prepared from 300 ml of water, 95.7 g of 1-hydroxy-7-aminonaphthalene-3-sulfonic acid and 182 g triethanolamine, in the course of 30 minutes. The diazotizing vessel was subsequently rinsed out with 50 ml of water. After 125 g of urea had been dissolved in the batch, it was bulked with a further, small amount of water to a total amount of 1250 g to form a storable solution of the dye of the formula I.

Used in the ink jet process, the solution gives similar results to those described above.

We claim:

1. A process of ink jet printing, comprising directing, onto a substrate, droplets of a dye preparation comprising 0.01 to 10% by weight, based on the weight of the preparation, of a dye quantity which is from 90 to 100% by weight of the dye of the formula I

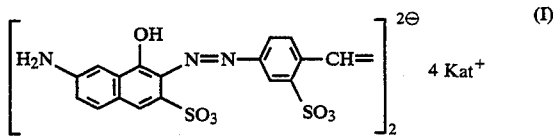

wherein Kat+ is the equivalent of a metal or ammonium ion, from 0 to 15% by weight, based on the weight of the preparation, of one or more water-miscible organic solvents, and from 75 to 99.99% by weight, based on the weight of the preparation of water, wherein said dye preparation is essentially free of foreign salts.

2. The process of claim 1, wherein said Kat+ is an ammonium ion.

3. The process of claim 1, wherein said Kat+ is a diethanolammonium ion.

4. The process of claim 1, wherein said dye preparation contains 0–10% by weight of foreign salts.

5. The process of claim 1, wherein said dye preparation comprises 0.1 to 5% by weight of dye.

6. The process of claim 1, wherein said dye preparation comprises 5 to 15 % by weight of a water-miscible organic solvent.

7. The process of claim 1, wherein said water miscible organic solvent is selected from the group consisting of $C_{1-4}$ alkanols, carboxamides, lactams, cyclic ureas, ketones, keto alcohols, ethers, mono $C_{2-6}$ alkylene glycols, oligo $C_{2-6}$ alkylene glycols, poly $C_{2-6}$ alkylene glycols, mono $C_{2-6}$ alkylene thioglycols, oligo $C_{2-6}$ alkylene thioglycols, poly $C_{2-6}$ alkylene thioglycols, $C_{1-4}$ alkyl ethers of polyhydric alcohols, γ-butyrolactone, dimethyl sulfoxide and a mixture thereof.

8. The process of claim 1, wherein said water-miscible organic solvent is selected from the group consisting of N-methylpyrrolidin-2-one, diethylene glycol, dimethyl sulfoxide and a mixture thereof.

9. The process of claim 1, wherein said foreign salts are selected from the group consisting of sodium chloride, potassium chloride, sodium sulfate, potassium sulfate and a mixture thereof.

10. The dye of the formula Ia

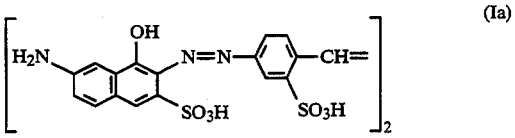

in pure form.

* * * * *

UNITED STATES PATENT AND TRADEMARK OFFICE
CERTIFICATE OF CORRECTION

PATENT NO. : 5,431,723
DATED : July 11, 1995
INVENTOR(S) : Rudolf BERMES, et al.

It is certified that error appears in the above-indentified patent and that said Letters Patent is hereby corrected as shown below:

On the title page, Item [54], and Column 1, Lines 2-4, the title should read:

--USE OF LIQUID PREPARATIONS OF A DISAZO DYE IN THE INK JET PROCESS AND THE DISAZO DYE--

Signed and Sealed this

Twenty-ninth Day of August, 1995

Attest:

BRUCE LEHMAN

*Attesting Officer*     *Commissioner of Patents and Trademarks*